(12) United States Patent
Chen

(10) Patent No.: US 10,206,018 B2
(45) Date of Patent: Feb. 12, 2019

(54) TRANSMISSION METHOD AND SYSTEM FOR OPTICAL BURST TRANSPORT NETWORK

(71) Applicant: ZTE Corporation, Shenzhen (CN)

(72) Inventor: Xun Chen, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 0 days.

(21) Appl. No.: 15/534,179

(22) PCT Filed: Dec. 8, 2015

(86) PCT No.: PCT/CN2015/096692
§ 371 (c)(1),
(2) Date: Jun. 8, 2017

(87) PCT Pub. No.: WO2016/091153
PCT Pub. Date: Jun. 16, 2016

(65) Prior Publication Data
US 2017/0339474 A1 Nov. 23, 2017

(30) Foreign Application Priority Data
Dec. 10, 2014 (CN) .......................... 2014 1 0758228

(51) Int. Cl.
*H04J 14/00* (2006.01)
*H04Q 11/00* (2006.01)
(Continued)

(52) U.S. Cl.
CPC ......... *H04Q 11/0066* (2013.01); *H04B 10/25* (2013.01); *H04L 41/00* (2013.01);
(Continued)

(58) Field of Classification Search
CPC .. H04B 10/25; H04B 10/0773; H04B 10/675; H04Q 11/0066; H04Q 2011/0081;
(Continued)

(56) References Cited

U.S. PATENT DOCUMENTS 9,698,930 B2 *   7/2017  Wang ................. H04J 14/0227
9,755,980 B2 *   9/2017  Chen .................. H04Q 11/0066
(Continued)

FOREIGN PATENT DOCUMENTS

CN          101043267 A        9/2007
CN          101895367     *   11/2010   .............. H04J 14/02
(Continued)

OTHER PUBLICATIONS

Jaedon Kim et al.: "Optical Burst Transport: A Technology for the WDM Metro Ring Networks", Journal of Lightwave Technology, IEEE Service Center, New York NY, US, vol. 25, No. 1, Jan. 1, 2007, pp. 93-102, XP011175470, ISSN: 0733-8724,DOI: 10.1109/JLT.2006.888483.
(Continued)

*Primary Examiner* — M. R. Sedighian
(74) *Attorney, Agent, or Firm* — Plumsea Law Group, LLC

(57) ABSTRACT

A transmission method and system for an optical burst transport network are disclosed in the present document. The method includes: acquiring a topology of a mesh OBTN network, and generating one or more logical sub-networks according to the topology of the mesh OBTN network; a predetermined master node in the mesh OBTN network updating bandwidth maps for all logical sub-networks; the predetermined master node is a node, which all control channels pass through, in all the nodes of the mesh OBTN network.

11 Claims, 12 Drawing Sheets

(51) Int. Cl.
  *H04B 10/25* (2013.01)
  *H04L 12/24* (2006.01)
  *H04B 10/077* (2013.01)
  *H04B 10/67* (2013.01)

(52) U.S. Cl.
  CPC ...... *H04L 41/0695* (2013.01); *H04B 10/0773* (2013.01); *H04B 10/675* (2013.01); *H04Q 2011/0081* (2013.01); *H04Q 2011/0086* (2013.01); *H04Q 2011/0088* (2013.01); *H04Q 2011/0098* (2013.01)

(58) Field of Classification Search
  CPC ... H04Q 2011/0086; H04Q 2011/0088; H04Q 2011/0098; H04L 41/0695; H04L 41/00
  USPC .......................................................... 398/51
  See application file for complete search history.

(56) References Cited

U.S. PATENT DOCUMENTS

| | | | |
|---|---|---|---|
| 9,888,302 B2* | 2/2018 | Chen | .................. H04Q 11/0066 |
| 2004/0120261 A1 | 6/2004 | Ovadia et al. | |
| 2006/0109855 A1 | 5/2006 | Rodrigo | |
| 2008/0131122 A1* | 6/2008 | Reisslein | ............ H04J 14/0227 398/59 |
| 2012/0099853 A1* | 4/2012 | Fu | ........................... H04J 3/085 398/3 |

FOREIGN PATENT DOCUMENTS

| | | |
|---|---|---|
| CN | 101895367 A | 11/2010 |
| JP | 2004135352 A | 4/2004 |
| JP | 2011097146 A | 5/2011 |
| JP | 2017511624 A | 4/2017 |
| WO | 02/19616 A2 | 3/2002 |
| WO | 2010054566 A1 | 5/2010 |

OTHER PUBLICATIONS

Extended European Search Report dated Nov. 9, 2017 for European Patent Application No. 15866470.6.
PCT International Search Report dated Feb. 29, 2016, Application No. PCT/CN2015/096692, 3 Pages.
Office Action dated May 8, 2018 for Japanese Patent Application No. 2017-530145 (machine translation).

* cited by examiner

TRANSMISSION METHOD AND SYSTEM FOR OPTICAL BURST TRANSPORT NETWORK

CROSS-REFERENCE TO RELATED APPLICATIONS

This application is a U.S. national phase of PCT Application No. PCT/CN2015/096692 filed on Dec. 8, 2015, which claims priority to Chinese Patent Application No. 201410758228.7 filed on Dec. 10, 2014, the disclosures of which are incorporated in their entirety by reference herein.

TECHNICAL FIELD

The present application relates to, but is not limited to field of optical network technology.

BACKGROUND

The global data traffics increase explosively, and newly-emerging services represented by video and streaming media services develop rapidly, such that data services with dynamic, high-bandwidth and high-quality requirement become the main body of network traffics, and drive the network to evolve towards the packetization. On an aspect of a transport network, it can be seen that the development is from a traditional Synchronous Digital Hierarchy (SDH) circuit switching network to a Multi-Service Transfer Platform (MSTP, which is based on the SDH) with multi-service access functions, and then is gradually evolved to a Packet Transport Network (PTN) nowadays, which is exactly the result of the development of network traffic datamation. Fundamentally, the circuit switching network can only provide the rigid pipeline and coarse granularity switching, and cannot effectively meet the requirements of dynamism and burst of the data services, but the flexible pipeline and statistical multiplexing feature of the packet switching network are naturally suitable for the data services. However, the current packet switching is basically processed based on the electronic layer, and the cost and energy consumption are high, and with the rapid growth of the traffics, the processing bottleneck of the current packet switching is increasingly prominent, which is difficult to adapt to the high-speed, flexible, low-cost and low-energy requirements of the future networks. The optical network has an advantage of low cost, low energy consumption and high speed and large capacity, but the traditional optical circuit switching networks (such as Wavelength Division Multiplexing (WDM) and an Optical Transport Network (OTN)) can only provide the large granularity grid pipeline, which is short of the flexibility of the circuit packet switching and cannot effectively bear the data services.

In the access network, the Gigabit-Capable Passive Optical Network (GPON) technology combines the advantages of the optical layer and the electronic layer to a certain extent. In a downstream direction, the GPON technology, by means of optical layer broadcast, distributes a downstream signal transmitted by an Optical Line Terminal (OLT) to multiple Optical Network Units (ONUs) via an optical splitter, and meanwhile, a bandwidth map of an upstream frame is carried in a downstream frame header, to indicate the transmitting time and length of the upstream data of ONU. In an upstream direction, each ONU transmits the data according to an indication of the bandwidth map, and multiplexes the data to one wavelength path via an optical coupler and uploads the data to the OLT. Therefore, the GPON possesses the characteristics of high speed and large capacity and low cost of the optical layer on one hand, and implements the optical-layer statistic multiplexing of the multi-channel data in the upstream direction on the other hand, which improves the flexibility and the bandwidth utilization. The GPON normally uses the star/tree networking topology, and a working principle thereof is suitable for bearing the multipoint-to-single-point converged traffics (the north-south oriented traffics predominate), thus the successful application and large-scale deployment are achieved in the access network.

However, with respect to a non-converged application scenario, such as a metropolitan area core network and a data center internal switching network, the east-west oriented traffics account for a large proportion and even occupy a leading position, thus the GPON technology is apparently unsuitable (the east-west oriented traffics need to be forwarded by the electronic layer of the OLT, but the capacity of the GPON is limited). The Optical Burst Transport Network (OBTN) adopts all-optical switching technology based on the Optical Burst (OB), and possesses the capabilities of optical layer bandwidth on demand and fast scheduling between arbitrary network node pairs, which can realize the dynamic adaptation and good support to multiple traffic (such as north-south oriented burst traffics and east-west oriented burst traffics, etc.) scenarios, and can enhance the resource utilization efficiency and network flexibility, and maintain the advantages of high speed and large capacity and low cost of the optical layer in the meantime, and be suitable for multiple star/tree/ring network topologies.

Optical Burst Transport Network (OBTN) is an optical transmission technology of wavelength division multiplexing of which the granularity is between Optical Circuit Switching (OCS) and Optical Packet Switching (OPS). The key idea of the OBTN is to take full advantage of the huge bandwidth of optical fiber and the flexibility of electronic control, and separate the control channel and data channel. The data channel performs the all-optical switching technology by using the data frame based on the Optical Burst (OB) as the switching unit, while one control frame in the control channel corresponds to one data frame, which is also transmitted in the optical domain, but at the node, it is converted to the electric domain for processing to receive and update the corresponding control information, and is in the continuous transceiver mode. It can be understandable that, there may be more than one data channels, or there may be more than one control channels.

A device of the optical burst transport network needs a control channel to transmit the control information. Each device controls the burst reception and burst transmitting of the optical signal of the data channel at each node device according to the received control information, and the OBTN network needs that one control frame corresponds one data frame to transmit. In the complex mesh OBTN optical burst transport network, on the one hand, there are multiple transmission paths from node to node, and on the other hand, the transmission of the data channel optical signal on any fiber at any node in the entire network needs the control frame with no collision to control. Currently, for the complex OBTN network, there is no mature implementation scheme.

SUMMARY

A summary of the topic described in detail in the document is described below. The summary is not intended to limit the protective scope of the claims.

The document provides a control transmission scheme for a complex mesh OBTN network.

A transmission method for an optical burst transport network includes:

acquiring a topology of a mesh OBTN network, and generating one or more logical sub-networks according to the topology of the mesh OBTN network;

updating, by a predetermined master node in the mesh OBTN network, bandwidth maps for all the logical sub-networks; herein the predetermined master node is a node, which all control channels pass through, in all nodes of the mesh OBTN network.

In an exemplary embodiment, the predetermined master node is a node, which all logical sub-networks pass through, in all nodes which all the control channels pass through.

In an exemplary embodiment, updating, by a predetermined master node in the mesh OBTN network, bandwidth maps for all logical sub-networks includes:

transmitting, the predetermined master node in the mesh OBTN network, a corresponding data frame to a slave node along all the logical sub-networks, and selectively transmitting a control frame carrying a bandwidth map; performing a bandwidth allocation calculation according to a bandwidth request transmitted by the slave node, generating a new bandwidth map, and transmitting the new bandwidth map to the slave node through the control frame.

In an exemplary embodiment, the control frame includes the following information: a logical sub-network number, a bandwidth map for each logical sub-network, a bandwidth request of each node in a next time period; the bandwidth map includes indicators for Add wavelength and Drop wavelength of a node in each logical sub-network; and the bandwidth request includes amount of data which each node expects to transmit in the next time period.

In an exemplary embodiment, the acquiring the topology of a mesh OBTN network, and generating one or more logical sub-networks according to the topology of the mesh OBTN network includes: traversing all nodes in different sequences to generate each logical sub-network; or dividing to obtain logical sub-networks according to data transmission requirements between nodes.

In an exemplary embodiment, each logical sub-network has a separate data channel; and one control channel corresponds to one or more data channels.

In an exemplary embodiment, the method further includes:

when one logical sub-network is broken, the master node allocates data to transmit from other logical sub-network.

A transmission system for an optical burst transport network includes:

a control platform unit, configured to acquire a topology of a mesh OBTN network, and generate one or more logical sub-networks according to the topology of the mesh OBTN network;

a network control unit, arranged at a predetermined master node in mesh OBTN network, configured to update bandwidth maps for all logical sub-networks; herein, the predetermined master node is a node, which all the control channels pass through, in all nodes of the mesh OBTN network.

In an exemplary embodiment, the predetermined master node is a node, which all logical sub-networks pass through, in all nodes which all the control channels pass through.

In an exemplary embodiment, the network control unit includes:

a control channel transceiving and processing subunit, configured to transmit a corresponding data frame to a slave node along each of all logical sub-networks, and selectively transmit a control frame carrying the bandwidth map;

a bandwidth map allocation subunit, configured to perform a bandwidth allocation calculation according to a bandwidth request transmitted by the slave node, and generate a new bandwidth map.

Herein, the control channel transceiving and processing subunit is further configured to transmit the new bandwidth map to the slave node through the control frame.

In an exemplary embodiment, the control frame includes the following information: a logical sub-network number, a bandwidth map for each logical sub-network, a bandwidth request of each node in a next time period; the bandwidth map includes indicators for Add wavelength and Drop wavelength of a node in each logical sub-network; and the bandwidth request includes amount of data which each node expects to transmit in the next time period.

In an exemplary embodiment, the control platform unit is configured to traverse all nodes in different sequences to generate each logical sub-network; or divide to obtain logical sub-networks according to data transmission requirements between nodes.

In an exemplary embodiment, each logical sub-network has a separate data channel; and one control channel corresponds to one or more data channels.

In an exemplary embodiment, the network control unit is further configured to allocate data to transmit from other logical sub-network when one logical sub-network is broken.

A computer-readable storage medium storing computer-executable instructions is provided, and the computer-executable instructions are used to execute any one of the above-mentioned method.

According to the development from the simple OBTN to the more complex mesh OBTN in the existing art, embodiments of the present disclosure propose that logical sub-networks of the OBTN optical burst transport network are determined at first, which are controlled by the master node, and each logical sub-network adopts the synchronous transmission control scheme of the independent control frame and the data frame. Embodiments of the present disclosure reduce the complexity of the system and realize the complex mesh OBTN. In addition, another embodiment of the present disclosure proposes a scheme for OBTN network line protection.

After reading and understanding the accompanying drawings and detailed description, other aspects can be understood.

DETAILED DESCRIPTION

The embodiments of the present disclosure will be described below in combination with accompanying drawings.

It needs to be noted that if there is no conflict, the embodiments of the present disclosure and the various features in the embodiments can be combined with each other. Furthermore, although a logical sequence is given in flow charts, in some cases, the steps shown or described may be executed in a different sequence from here.

Figure 1:
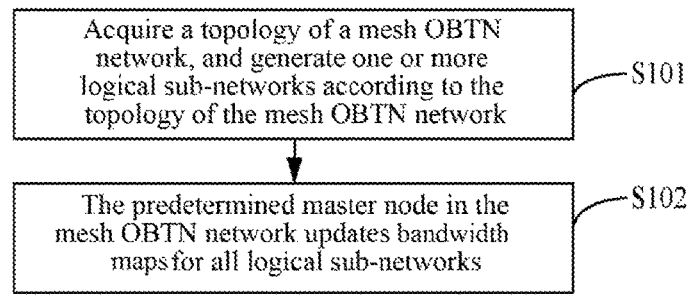
FIG. 1 is a flow chart of a transmission method for an optical burst transport network according to an embodiment of the present disclosure.

As shown in FIG. 1, a transmission method for an optical burst transport network includes steps S101 to S102.

In step S101, a topology of a mesh OBTN network is acquired, and one or more logical sub-networks is generated according to the topology of the mesh OBTN network.

Figure 2:
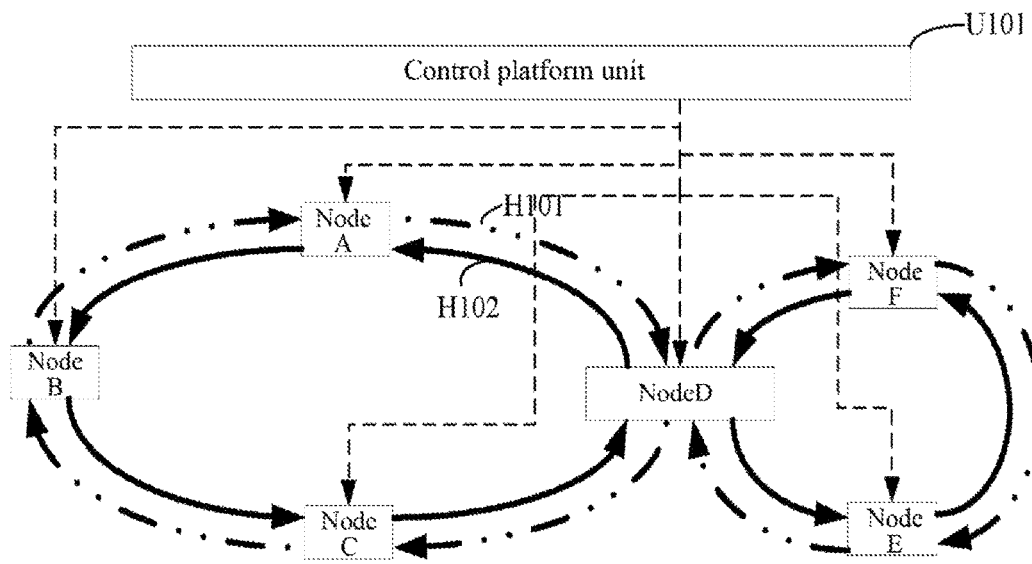
FIG. 2 is a schematic diagram of a network topology of a mesh OBTN network.

The OBTN network shown in FIG. 2 includes six OBTN node devices, i.e., Node A, Node B, Node C, Node D, Node E, Node F, and solid line and two-dot chain line are fiber connection modes between nodes, representing different fibers. FIG. 2 shows a topology diagram of the actual connected fiber, and the connection lines between nodes represent the actual fiber connection between the nodes and the direction of transmission within the fiber. The control platform unit U101 implements network device management, for example, the device information may be transmitted through the optical supervisory channel (OSC). Then, the equipment management in the entire network is implemented by the control platform unit U101, and the network topology is acquired as shown in FIG. 2, that is, the interconnection situation of each node is acquired.

Figure 3:
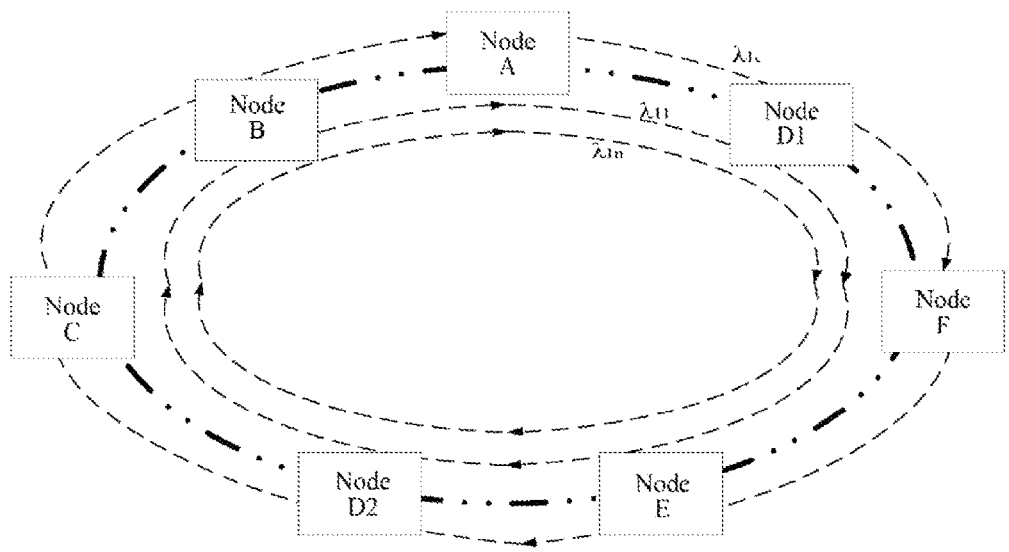
FIG. 3 is a schematic diagram of a logical sub-network H101 of a mesh OBTN network according to an embodiment of the present disclosure.
Figure 4:
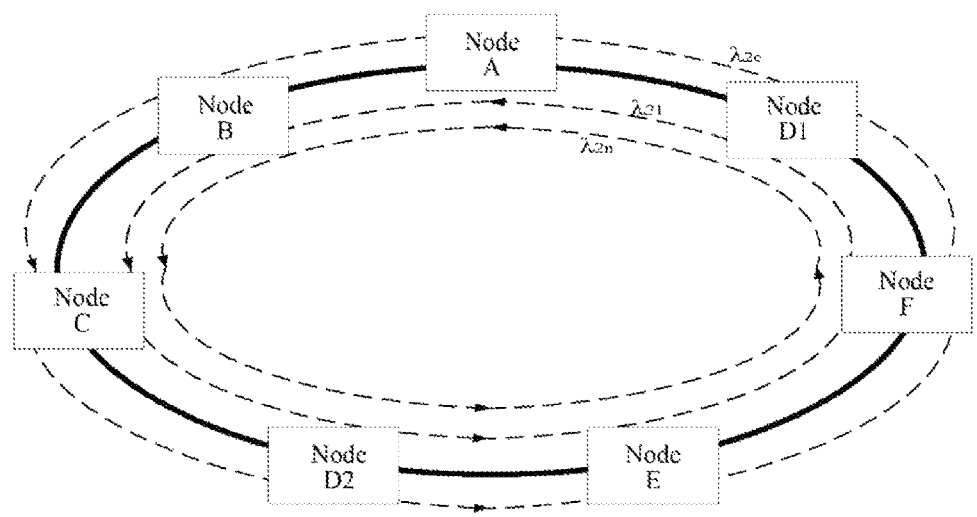
FIG. 4 is a schematic diagram of another logical sub-network H102 of a mesh OBTN network according to an embodiment of the present disclosure.

The control platform unit U101 may convert a mesh OBTN network into a combination of one or more logical sub-networks. The basis for generating logical sub-networks may be to traverse all nodes in different sequences to generate each logical sub-network. For example, the network shown in FIG. 2 may be transformed into two unidirectional logical sub-networks, H101 and H102, as shown in FIG. 3 and FIG. 4. All services in the logical sub-network of FIG. 3 occupy one optical fiber in a wavelength division multiplexing manner. FIG. 4 selects an opposite direction of FIG. 3 for transmission, and all services in the logical sub-network of FIG. 4 occupy another optical fiber in the wavelength division multiplexing manner.

Another basis for generating a logical sub-network may be to divide to obtain the logical sub-networks according to data transmission requirements between nodes. For example, in the network shown in FIG. 2, if the bandwidth demand for data transmission among the node A, node B, node C, and node D is large, and in addition, the demand for data transmission among the node D, node E, and node F is large, and the left less part of the data are transmitted in any node pairs among the node A, node B, node C, node D, node E, and node F, then the network shown in FIG. 2 may also be transformed into three unidirectional logical sub-networks as shown in FIG. 3 and FIG. 5 and FIG. 6.

Figure 5:
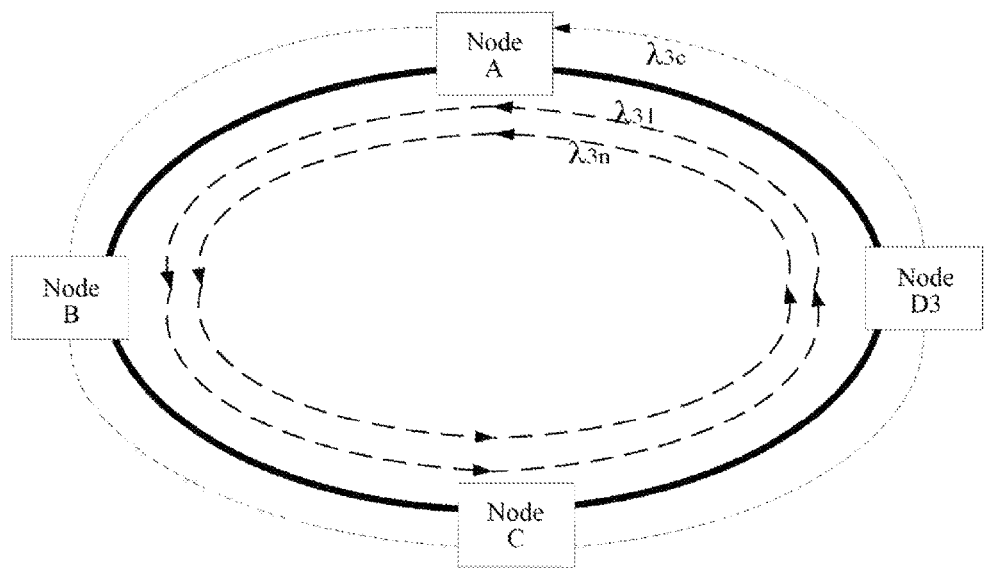
FIG. 5 is a schematic diagram of another logical sub-network H103 of a mesh OBTN network according to an embodiment of the present disclosure.
Figure 6:
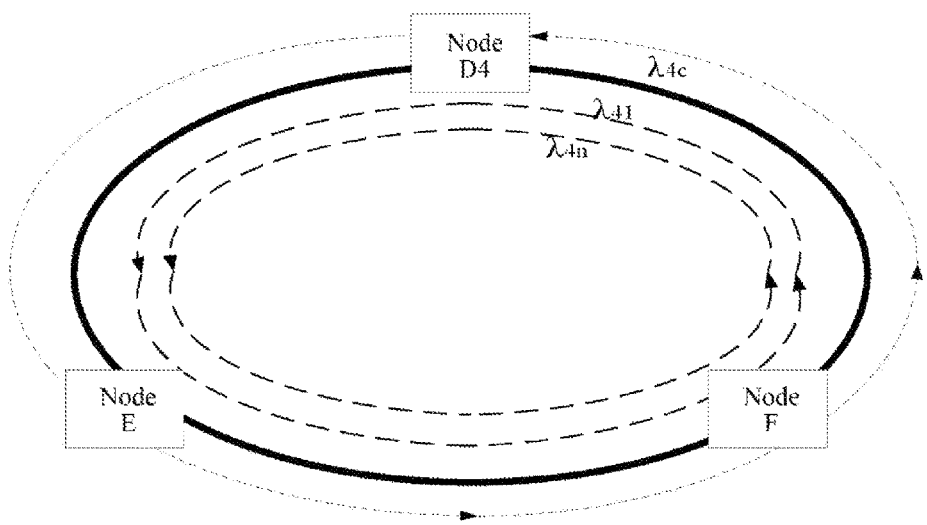
FIG. 6 is a schematic diagram of another logical sub-network H104 of a mesh OBTN network according to an embodiment of the present disclosure.

The requirements for generating the logical sub-networks: as shown in FIG. 5 and FIG. 6, it is not necessary for each logical sub-network to traverse all nodes. One section of path in the generated logical sub-network may occupy one optical fiber, or any overlapping path of multiple logical sub-networks may be simultaneously transmitted in one optical fiber in the wavelength division multiplexing manner.

As shown in FIG. 3, when a logical sub-network passes through the Node D for twice, then Node D is virtualized to be two virtual node devices, Node D1 and Node D2, at different locations of the logical sub-network. Node D1 and Node D2 respectively correspond to different positions in the logical sub-network, and Node D1 and Node D2 are controlled separately in the control frame information. The control frame information includes the node information fields, Node D1 and Node D2.

Each logical sub-network has a separate data channel, which may be one control channel corresponding to multiple data channels, and may also be one control channel corresponding to one data channel. For example, the three divided logical sub-networks have one data channel respectively, but the control channel is transmitted only through one of the logical sub-networks. The situation may also be that each logical sub-network has one control channel.

In step S102, a predetermined master node in the mesh OBTN network updates bandwidth maps for all logical sub-networks. The control channel information of all logical sub-networks converges at the master node, and control channel transceiving and processing subunit of the master node may process bandwidth requests of multiple logical sub-networks. After a bandwidth request of one slave node is transmitted to the master node, the master node may allocate the slave node to transmit data in any of the logical sub-networks by analyzing the bandwidth allocation of each logical sub-network.

One node may be selected as the master node of the OBTN network through the control platform unit, or one node may be pre-configured as the master node when the network is laid.

When the master node is configured, any node through which all the control channels pass in the logical sub-network, may be selected, that is, control channels must pass through the master node. In an exemplary embodiment, a node which all logical sub-networks pass through is selected to be the master node in all nodes which all the control channels pass through, as the Node D shown in FIG. 2. The set of selected nodes which all the control channels pass through should contain all nodes in the entire OBTN network.

Different logical sub-networks form link protection for each other. For example, if the logical sub-network of FIG. 3 is broken, the master node may allocate the data to transmit from the logical sub-network of FIG. 4. Logical sub-networks are independent of each other and each of the logical sub-networks implements optical bursts switching to transmit data.

Figure 7:
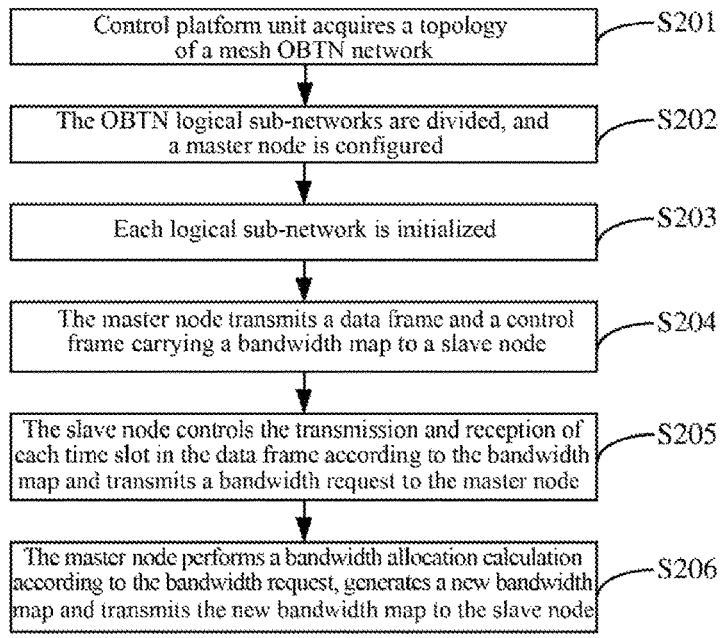
FIG. 7 is a schematic diagram of an implementation step of an example of a transmission method for a mesh OBTN network.

FIG. 7 shows an example of a transmission method for a mesh optical burst transport network (OBTN), which includes the steps from S201 to S206.

In step S201, the control platform unit acquires a topology of a mesh OBTN network.

In step S202, OBTN logical sub-networks are divided, and a master node is configured.

In step S203, each logical sub-network is initialized.

First, a logical sub-network needs to be initialized. The master node measures a ring length L of the OBNN logical sub-network. L is a transmission time length of one round of the logical sub-network measured by the master node. The length T+T1 of each OB is adjusted according to the measurement result (T is a data length of the OB packet, and T1 is a guard interval between the OB packets), and the number N of OBs in the ring is calculated, then L=(T+T1)× N. Synchronous training is performed through the master node. The master node transmits a control frame ahead of data frame for time T2. At a slave node, after receiving the control frame for photoelectric conversion and parse, then the slave node receives a corresponding data frame and feeds back time difference for reception. The main node multiple adjusts T2 for multiple times to complete the device initialization.

In step S204, the master node transmits a corresponding data frame to the slave node along each logical sub-network, and selectively transmits a control frame carrying the bandwidth map (each logical sub-network has an independent data frame, and multiple logical sub-networks may share a control frame).

In step S205, the slave node controls the transmission and reception of each time slot in the data frame according to the bandwidth map, and transmits a bandwidth request to the master node.

According to the result of the initialization, the master node transmits a data frame and a control frame carrying the bandwidth map to the slave node. The slave node controls the transmission and reception of each time slot in the data frame according to the bandwidth map, and transmits a bandwidth request to the master node by filling the control frame. The master node performs a bandwidth allocation calculation according to the bandwidth request, generates a new bandwidth map and transmits the new bandwidth map to the slave node through the control frame.

In step S206, the master node performs the bandwidth allocation calculation according to the bandwidth request, generates the new bandwidth map, and transmits the new bandwidth map to the slave node.

After receiving the bandwidth request transmitted by each slave node, the master node may perform the wavelength allocation and time slot allocation for each node by the Dynamic Bandwidth Allocation (DBA) algorithm according to a current resource state of the entire network and the bandwidth request of each slave node, and generate the new bandwidth map to transmit to the slave node.

Figure 8:
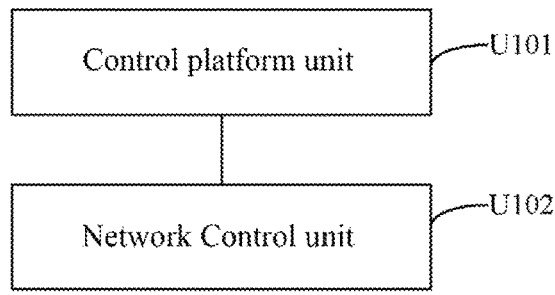
FIG. 8 is a schematic diagram of a transmission system for an optical burst transport network according to an embodiment of the present disclosure.

As shown in FIG. 8, a transmission system for an optical burst transport network includes a control platform unit U101 and a network control unit U102.

The control platform unit U101 is configured to acquire a topology of a mesh OBTN network, and generate one or more logical sub-networks according to the topology of the mesh OBTN network.

The network control unit U102, arranged at a predetermined master node in mesh OBTN network, is configured to update bandwidth maps for all the logical sub-networks. Herein, the predetermined master node is a node, which all control channels pass through, in all nodes of the mesh OBTN network.

In an exemplary embodiment, the predetermined master node is a node, which logical sub-networks all pass through, in all nodes which all the control channels pass through.

Figure 9:
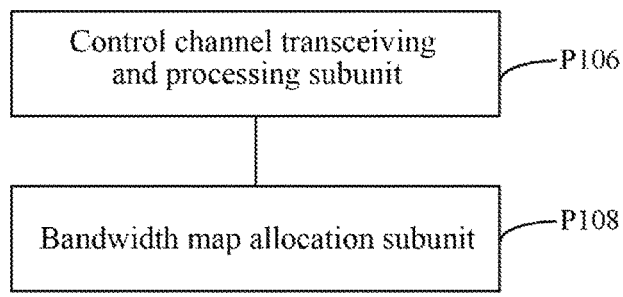
FIG. 9 is a schematic diagram of the composition of a network control unit according to an embodiment of the present disclosure.

Herein, as shown in FIG. 9, the network control unit U102 includes a control channel transceiving and processing subunit P106 and a bandwidth map allocation subunit P108.

The control channel transceiving and processing subunit P106 is configured to transmit a corresponding data frame and a control frame carrying the bandwidth map to a slave node along each of all the logical sub-networks.

The bandwidth map allocation subunit P108 is configured to perform a bandwidth allocation calculation according to a bandwidth request transmitted by the slave node, and generate a new bandwidth map.

The control channel transceiving and processing subunit P106 is further configured to generate a control frame by the new bandwidth map information and transmit to the slave node.

Herein, the control platform unit U101 may traverse all nodes in different sequences to generate each logical sub-network; or may divide to obtain the logical sub-networks according to data transmission requirements between nodes.

Herein, each logical sub-network has a separate data channel; and one control channel corresponds to one or multiple data channels.

Herein, the network control unit U102 is further configured to allocate data to transmit from other logical sub-network when one logical sub-network is broken.

Figure 10:
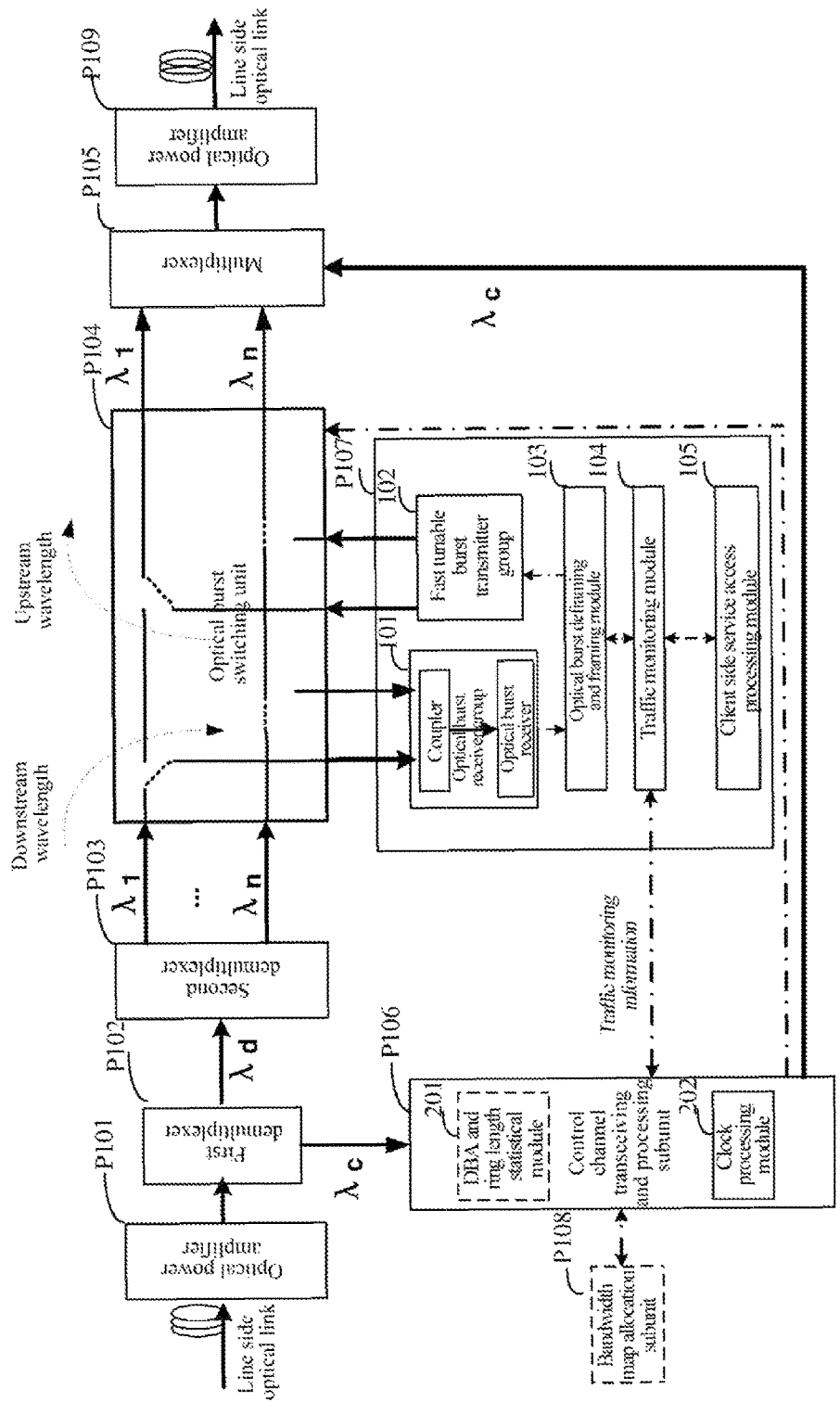
FIG. 10 is a structural schematic diagram of a logical sub-network node device of an OBTN network.

A structure of a node device for optical burst transport network is as shown in FIG. 10. Any node in a logical sub-network may be any actual node or virtual node, and includes the following:

as shown in FIG. 10, an optical power amplifier P101, a first demultiplexer P102, a second demultiplexer P103, a control channel transceiving and processing subunit P106, an optical burst switching unit P104, a client side service processing unit P107, and a bandwidth map allocation subunit P108, a multiplexer P105, an optical power amplifier P109, and the like. In the figure, the solid line represents an optical signal, and the dotted line represents an electric signal.

The first demultiplexer P102 separates the control channel wavelength $\lambda c$ from the data channel wavelength $\lambda d$. There may be more than one data channel wavelengths $\lambda d$, and multiple data channel wavelengths are $\lambda 1$, $\lambda 2$ to $\lambda n$, respectively. There may also be more than one control channel wavelengths λc, and multiple control channel wavelengths are λc1 and λc2, respectively. The separated control channel wavelength λc and the data channel wavelength λd are transmitted to the control channel transceiving and processing subunit P106 and the second demultiplexer P103, respectively.

The second demultiplexer P103 separates the data channel wavelengths to be λ1, λ2 to λn, to transmit to the optical burst switching unit P104.

The client side service processing unit P107 includes an optical burst receiver group 101, a fast tunable burst transmitter group 102, an optical burst deframing and framing module 103, a traffic monitoring module 104, and a client side service access processing module 105. The client side service access processing module 105 receives a client side service. The control channel transceiving and processing subunit P106 includes a DBA and ring length statistical module 201 and a clock processing module 202.

The client side service access processing module 105 receives the client side data for data buffering and receives the data transmitted from the traffic monitoring module 104 and converts the data transmitted from the traffic monitoring module 104 into the client side service to transmit.

The traffic monitoring module 104 monitors the buffer data of the client side service access processing module 105, generates a bandwidth demand, and transmits the bandwidth demand to the control channel transceiving and processing subunit P106.

The optical burst deframing and framing module 103 reassembles the buffer data into OB packets, and then converts OB packets to optical signal and transmit to the optical burst switching unit P104. The optical burst deframing and the framing module 103 parses the received OB packets and the parsed data are transmitted through the client side service access processing module 105.

At the slave node, the control channel transceiving and processing subunit P106 receives the data transmitted from the control channel $\lambda_c$, and separates the bandwidth map transmitted by the master node to the present node, and, in accordance with the information in the bandwidth map, control the optical burst switching unit P104 and the client side service processing unit P107. The control channel transceiving and processing subunit P106 also adds the bandwidth demand of the node generated by the client side service processing unit P107 to the message field of $\lambda_c$ and transmits to the control channel $\lambda_c$ to transmit to the next node until it is transmitted to the master node for information processing.

The control channel transceiving and processing subunit P106 of the master node transmits the bandwidth demand generated by the client side service processing unit P107 of the present node and the bandwidth request information uploaded by the slave node through the control channel $\lambda_c$ to the bandwidth map allocation subunit P108 to performs a bandwidth allocation calculation and generate a new bandwidth map. Then, the master node transmits the new bandwidth map to the slave node through the control channel transceiving and processing unit. The master node includes the bandwidth map allocation subunit P108, and the slave node does not need the bandwidth map allocation subunit P108.

At any node, the control channel transceiving and processing subunit P106 controls the optical burst switching unit P104 and determines the direction control of the different optical wavelengths in the optical burst switching unit P104 according to the bandwidth map information. The optical signal inputted by the optical burst switching unit P104 includes an optical signal of data channel wavelengths $\lambda_1, \lambda_2$ to $\lambda_n$, and an optical signal uploaded by the client side service processing unit, and the optical burst switching unit P104 performs optical burst reception and optical burst transmission processing, which may be achieved by using a fast optical switch array.

The multiplexer P105 combines the transmitted control channel wavelength $\lambda_c$ and the wavelengths of the data channel after the burst switching, and outputs to the optical power amplifier.

The optical power amplifier P109 implements the optical power amplification function in the line. A burst power amplifier may be used.

Embodiment One

FIG. 2 shows a topology diagram of a mesh OBTN network. This network includes 6 nodes, i.e., Node A, Node B, Node C, Node D, Node E and Node F. As shown in FIG. 2, the nodes are connected by two fibers, and the optical signal transmission directions within the optical fibers are shown in FIG. 2.

The operating steps are as follows.

In step 1, a control platform unit acquires a topology of a mesh OBTN network.

As shown in FIG. 2, the control platform unit U101 is connected with each node in the network through an optical supervisory channel (OSC). The OSC transmits the device information, and the control platform unit U101 acquires the OBTN network topology.

In step 2, the OBNN logical sub-networks are generated, and the master node is configured.

According to the topology structure of FIG. 2, the control platform unit U101 generates a logical sub-network H101 as shown in FIG. 3, and generates a logical sub-network H102 as shown in FIG. 4. The transmission direction of the logical sub-network H101 is: D1→F→E→D2→C→B→A→D1; wavelengths of the data channel transmitted in the logical sub-network H101 are $\lambda_{11}, \lambda_{12} \ldots \lambda_{1n}$, and a wavelength of the control channel is $\lambda_{1c}$. The transmission direction of the logical sub-network H102 is: D1→A→B→C→D2→E→F→D1, and the logical sub-network H101 are in the opposite direction to the logical sub-network H102, and wavelengths of the data channel transmitted in the logical sub-network H102 are $\lambda_{21}, \lambda_{22} \ldots \lambda_{2n}$, and a wavelength of the control channel is $\lambda_{2c}$. The control platform unit U101 configures Node D as the master node.

Since the logical sub-network H102 and the logical sub-network H101 use different optical fibers, $\lambda_{1i}$ and $\lambda_{2i}$ may use arbitrary wavelengths, i=1, 2, . . . , n.

Figure 11:
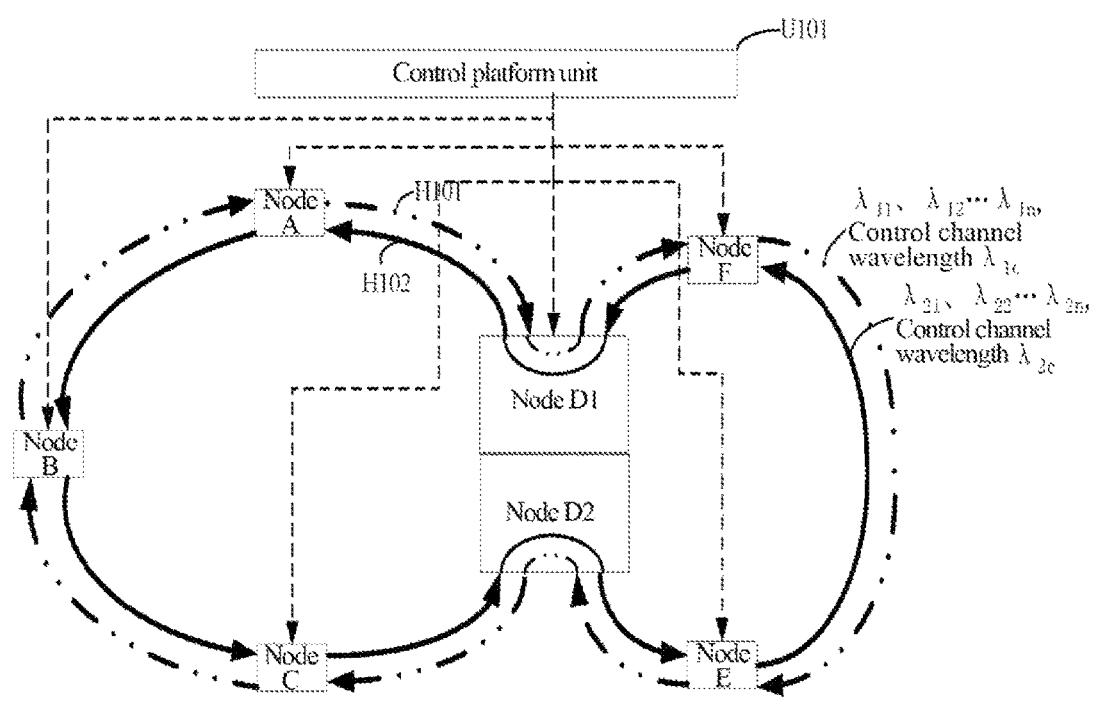
FIG. 11 is a schematic diagram of a mesh OBTN network corresponding to embodiment one of the present disclosure.

As shown in FIG. 11, FIG. 11 is a schematic diagram in which node D is virtualized to be node D1 and node D2 for transmission.

Figure 12:
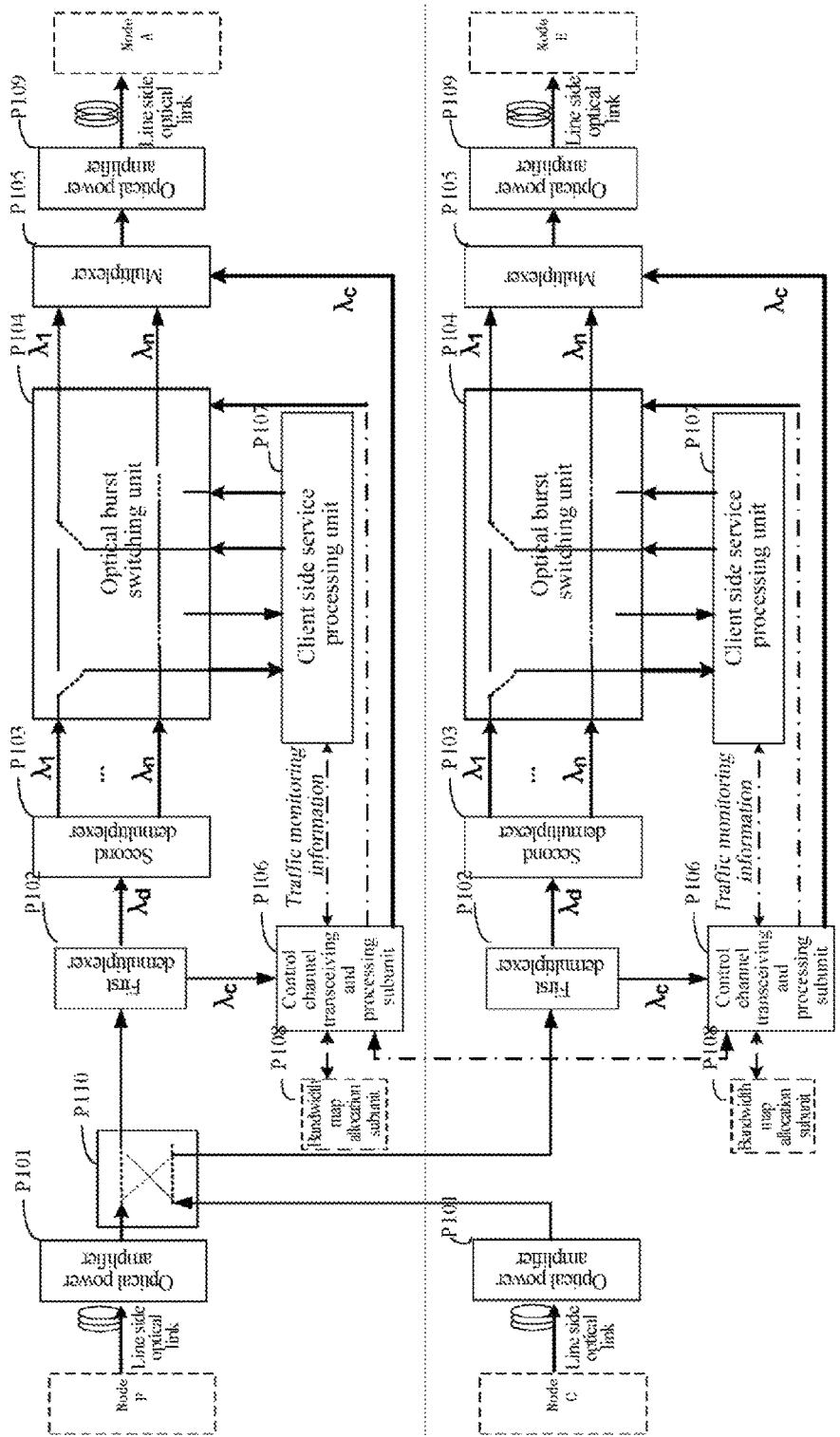
FIG. 12 is a schematic diagram of a master node, Node D, in embodiment one of the present disclosure.

As shown in FIG. 12, FIG. 12 is a schematic diagram of the master node D. In the present embodiment, the optical switch P110 is added, and the service from the node F may be selected to pass through the node D to the node A or the node E by the optical switch, or the service from the node C may be selected to pass through the node D to the node A or the node E by the optical switch. In the present embodiment, after selecting the logical sub-network H102, the P110 optical switch is configured as shown in the figure.

In step 3, each logical sub-network is initialized.

The ring length L of the logical sub-network of the OBNN is measured with the virtual node D1, of the main node in the logical sub-network H101 in FIG. 3, as the starting point. L is a transmission time length of one round of the logical sub-network measured by the master node, and the length T+T1 of each OB is acquired according to the measurement result (T is data length transmission time of the OB packet, T1 is a guard interval between the OB packets), and the number N of OBs in the ring is calculated, then L=(T+T1)× N. And then the synchronous training is performed through the master node, and the master node D1 transmits the control frame ahead of the data frame for time T2. At the slave node, the slave node first receives the control frame, and after performing the photoelectric conversion and parse, the slave node determines to receive the corresponding data frame, feeds back time difference for reception. The main node adjusts T2 for multiple times to complete the device initialization.

In step 4, the master node transmits s corresponding data frame and a control frame carrying the bandwidth map to a slave node along each of all the logical sub-networks.

Figure 14:
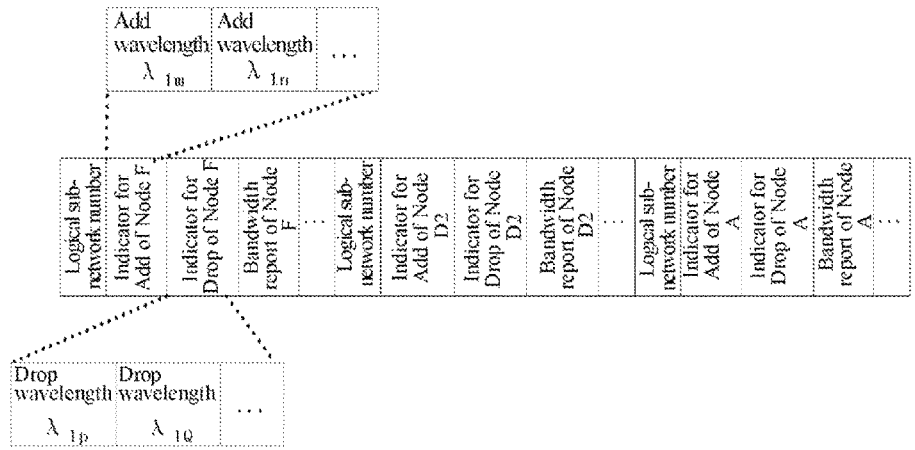
FIG. 14 is a schematic diagram of control frame information of a mesh OBTN network corresponding to embodiment two of the present disclosure.

After the master node initializes the logical sub-network H101 and the logical sub-network H102, the corresponding OB packets and the control frames carrying the bandwidth map are transmitted in the two sub-networks respectively. FIG. 14 is a schematic diagram of the control frame information of the logical sub-network H101, D1→F→E→D2→C→B→A→D1. The logical sub-networks H102 to H104 are similar. The control frame includes the following information: a logical sub-network number, a bandwidth map for each logical sub-network, a bandwidth request of each node in a next time period. The bandwidth map includes indicators for Add wavelength and Drop wavelength of the node in each logical sub-network. The bandwidth request includes amount of data which each node expects to transmit in the next time period.

In step 5, the slave node parses the control frame, controls the transmission and reception of each OB packet in the data frame, and transmits a bandwidth request to the master node.

According to the result of the initialization, the master node transmits a data frame and a control frame carrying a bandwidth map to the slave node. The slave node controls the transmission and reception of the time slot of each OB packet in the data frame according to the bandwidth map, and transmits a bandwidth request to the master node. The master node performs a bandwidth allocation calculation according to the bandwidth request, generates a new bandwidth map and transmits the new bandwidth map to the slave node.

In the logical sub-network H101, the first demultiplexer P102 separates the control channel wavelength $\lambda_{1c}$ and the data channel wavelengths $\lambda_{11}, \lambda_{12} \ldots \lambda_{1n}$ inside each node. The second demultiplexer P103 separates the data channel wavelengths $\lambda_{11}, \lambda_{12} \ldots \lambda_{1n}$ to transmit to the optical burst switching unit P104.

The client side service processing unit P107 includes an optical burst receiver group 101, a fast tunable burst transmitter group 102, an optical burst deframing and framing module 103, a traffic monitoring module 104, and a client side service access processing module 105. The client side service access processing module 105 receives the client side service.

The client side service access processing module 105 receives the client side data for data buffering, and receives the data transmitted from the receiving traffic monitoring module 104, and converts the data transmitted from the receiving traffic monitoring module 104 into the client side service to transmit.

The traffic monitoring module 104 monitors the buffer data of the client side service access processing module 105, generates a bandwidth demand, and transmits the bandwidth demand to the control channel transceiving and processing subunit P106.

The optical burst deframing and framing module 103 reassembles the buffer data into OB packets and converts the OB packets to the optical signal to transmit to the optical burst switching unit P104. The optical burst deframing and framing module 103 parses the received OB packets, and the parsed data are transmitted through the client side service access processing module 105.

The control channel transceiving and processing subunit P106 receives the control frame data transmitted from $\lambda_{1c}$, separates the bandwidth map information transmitted to the node by the master node, and controls the optical burst switching unit P104 according to the information in the bandwidth map and the control information therein.

The optical burst switching unit P104 is an optical switch array for performing optical burst reception for the data channel wavelengths $\lambda_{11}, \lambda_{12} \ldots \lambda_{1n}$, and the reception wavelength of the node is the downstream wavelength, or the optical burst switching unit P104 is controlled to be a pass-through. Optical burst transmission is performed on the optical signal uploaded by the client side service processing unit P107, which is the upstream wavelength.

The updated manner of the bandwidth map includes: at the master node, Node D, the control channel transceiving and processing subunit P106 transmits the bandwidth demand of the present node and the bandwidth request uploaded by each slave node through $\lambda_{1c}$ to the bandwidth map allocation subunit P108, to perform the bandwidth allocation calculation, and generate a new bandwidth map. The control channel transceiving and processing subunit P106 of the master node transmits the new bandwidth map information through the control frame.

At the slave node, the control channel transceiving and processing subunit P106 adds the bandwidth demand of the present node to the message field of $\lambda_c$ and transmits to the next node until it is transmitted to the master node.

Then, the multiplexer P105 combines the transmitted control channel wavelength $\lambda_{1c}$ and the burst-switched data channel wavelengths $\lambda_{11}, \lambda_{12} \ldots \lambda_{1n}$. While the optical power amplifier P109 implements the optical power amplification function in the line.

For example, the master node D transmits new bandwidth map information through the control frame, and carries the information, and from time t1 to time t2, the slave node, Node A, may transmit data through λ11. As shown in FIG. 5, the control frame is transmitted to the Node A, and after the control channel transceiving and processing subunit P106 of the Node A parses the control frame, it controls the optical burst switching unit P104 to keep the optical switch from the time t1 to t2, such that the λ11 in the data channel is dropped, and the optical signal uploaded by client side service processing unit P107 are added. Until the Node A accepts a new control frame, the operation is changed. Pass-through is performed on wavelength which is not allocated to Node A for using, such as $\lambda_{1n}$.

In step 6, the master node performs a bandwidth allocation calculation according to the bandwidth request, generates a new bandwidth map, and transmits the new bandwidth map to the slave node.

After receiving the bandwidth request transmitted by each slave node, the master node may perform the wavelength allocation and time slot allocation for each node and generate the new bandwidth map by the Dynamic Bandwidth Allocation (DBA) algorithm according to a current resource state of the entire network and a bandwidth request of each slave node.

The master node, Node D, needs to update the bandwidth map for different logical sub-networks, and controls the different logical sub-networks respectively, that is, updates the control frames of different logical sub-networks respectively.

Inter-node services may select a sub-network with a shorter path. For example, the client side service needs to be transmitted from node E to F, and logical sub-network H102 may be used.

The logical sub-network H102 and the logical sub-network H101 form a mutual protection relationship. For example, when the F→E signal in the logical sub-network H101 is broken or the fiber is broken, a control frame received by the master node D in the logical sub-network H101 is abnormal, the path F→D→A→B→C→D→E in the logical sub-network H102 may be used for protection switching.

Embodiment Two

FIG. 2 shows a topology diagram of a mesh OBTN network. This network includes 6 nodes, i.e., Node A, Node B, Node C, Node D, Node E and Node F. As shown in the figure, the nodes are connected by two optical fibers.

The operating steps are as follows.

In step 1, a control platform unit acquires a topology of a mesh OBTN network.

As shown in FIG. 2, the control platform unit U101 is connected with each node in the network through an optical supervisory channel (OSC). The OSC transmits the device information, and the control platform unit U101 acquires the topology of the OBTN network.

In step 2, the OBNN logical sub-networks are generated, and the master node is configured.

Figure 13:
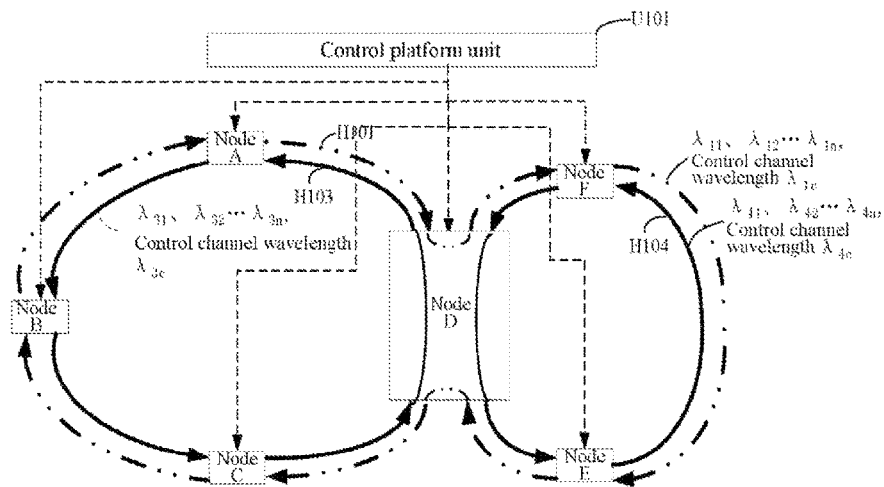
FIG. 13 is a schematic diagram of a mesh OBTN network corresponding to embodiment two of the present disclosure.

As shown in FIG. 13, the FIG. 13 is a schematic diagram of a logical sub-network transmission.

For a known network, if it is known that most of the services are transmitted between several nodes, for example, most of the services are transmitted mainly between Nodes A, B, C, and D, and are transmitted mainly between Node D, E, and F.

The control platform unit U101 generates three logical sub-networks. Firstly, the logical sub-network as shown in FIG. 2 is generated, of which the transmission direction is: D1→F→E→D2→C→B→A→D1; and wavelengths of the data channel transmitted by logical sub-network H101 are $\lambda_{11}, \lambda_{12} \ldots \lambda_{1n}$, and a wavelength of the control channel is $\lambda_{1c}$. Secondly, the logical sub-network H103 shown in FIG. 5 is generated, of which the transmission direction is: D3→A→B→C→D3; and wavelengths of the data channel transmitted by logical sub-network H103 are $\lambda_{31}, \lambda_{32} \ldots \lambda_{3n}$, and a wavelength of the control channel is $\lambda_{1c}$. Thirdly, the logical sub-network H104 shown in FIG. 6 is generated, of which the transmission direction is: D4>E>F→D4; wavelengths of the data channel transmitted by logical sub-network H104 are $\lambda_{41}, \lambda_{42} \ldots \lambda_{4n}$, and a wavelength of the control channel is $\lambda_{4c}$.

The control platform unit U101 configures Node D1 as the master node.

As shown in FIG. 12, the FIG. 12 is a schematic diagram of the master node, Node D. When the P110 optical switch is changed, the path is changed to the logical sub-network H103 and the logical sub-network H104.

In step 3, each logical sub-network is initialized.

This step is the same as that of the embodiment one.

In step 4, the master node transmits a corresponding data frame and a control frame carrying the bandwidth map to a slave node along each of all the logical sub-networks.

This step is the same as that of the embodiment one.

In step 5, the slave node controls the transmission and reception of each time slot in the data frame according to the bandwidth map, and transmits a bandwidth request to the master node.

In step 6, the master node performs a bandwidth allocation calculation according to the bandwidth request, generates a new bandwidth map, and transmits the new bandwidth map to the slave node.

The logical sub-networks H101, H103, H104 form a mutual protection relationship. For example, when the C→E signal in the logical sub-network H101 is broken or the fiber is broken, the path C→B→A→D1 in the logical sub-network H103 and the path D1→F→E in the logical sub-network H104 may be used for protection switching.

Embodiment Three

Figure 15:
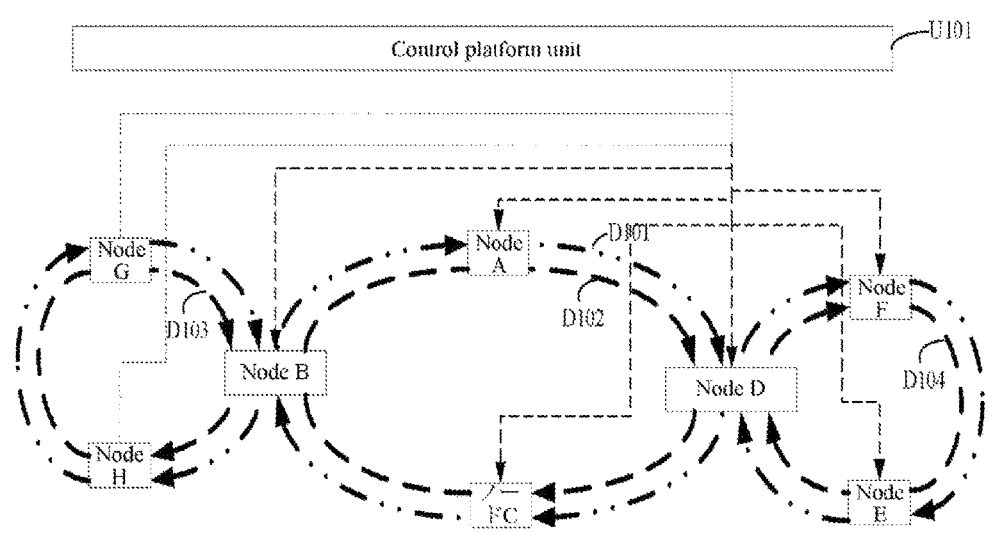
FIG. 15 is a schematic diagram of a network topology of a mesh OBTN network corresponding to embodiment three of the present disclosure.

FIG. 15 shows a topology diagram of a mesh OBTN network. The nodes are connected by a single fiber, as shown by a two-dot chain line.

The operating steps are as follows.

In step 1, the control platform unit U101 acquires a topology of a mesh OBTN network.

As shown in FIG. 15, the control platform unit U101 is connected with each node in the network through an optical supervisory channel (OSC). The OSC transmits the device information, and the control platform unit U101 acquires the OBTN network topology.

In step 2, the OBNN logical sub-networks are generated, and the master node is configured.

In this known network, it is known that most of the services are transmitted mainly between Node A, Node B, Node C, and Node D, and are transmitted mainly between Node D, Node E, and Node F, and are transmitted mainly between Node B, Node G and Node H. A small part of services are transmitted between Node B, Node G, Node H, and Node D, Node E, and Node F.

The control platform unit U101 generates four logical sub-networks. Firstly, a logical sub-network D101 is generated, of which the transmission direction is: D1→F→E→D2→C→B1→H→G→B2→A→D1; wavelengths of the data channel transmitted by logical sub-network D101 are only distributed two wavelengths $\lambda_1, \lambda_2$ according to the demand of the service, and a wavelength of the control channel is $\lambda_{1c}$. Secondly, the logical sub-network D102 is generated, of which the transmission direction is: D3→C→B3→A→D3; wavelengths of the data channel transmitted by logical sub-network D102 are $\lambda_{21}, \lambda_{22} \ldots \lambda_{2n}$. Thirdly, the logical sub-network D103 is generated, of which the transmission direction is: B4→H→G→B4. Wavelengths of the data channel transmitted by logical sub-network D104 are $\lambda_{41}, \lambda_{42} \ldots \lambda_{4n}$, of which the transmission direction is: D4→F→E→D4.

The control platform unit U101 configures the Node D1 through which all control channels pass as the master node.

Figure 17:
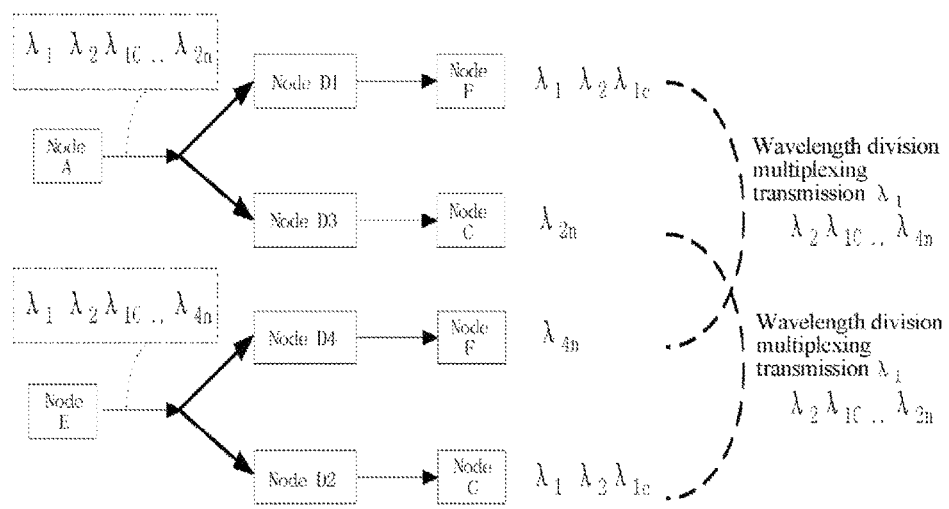
FIG. 17 is a schematic diagram of a wavelength division multiplexing transmission between the master node, Node D, and the neighboring nodes in embodiment three of the present disclosure.

Since the logical sub-networks D101 and D102, D103, and D104 are transmitted in the optical fiber shown by the same two-dot chain line, $\lambda_1$ and $\lambda_2$ of the logical sub-network D101 are transmitted in the wavelength division multiplexing manner by using different wavelengths and $\lambda_{2n}$; $\lambda_1$ and $\lambda_2$ of the logical sub-network D101 are transmitted in the wavelength division multiplexing manner by using different wavelengths and $\lambda_{3n}$; $\lambda_1$ and $\lambda_2$ of the logical sub-network D101 are transmitted in the wavelength division multiplexing manner by using different wavelengths and $\lambda_{4n}$. FIG. 17 is a schematic diagram of the wavelength division multiplexing between node D and neighboring nodes.

Figure 18:
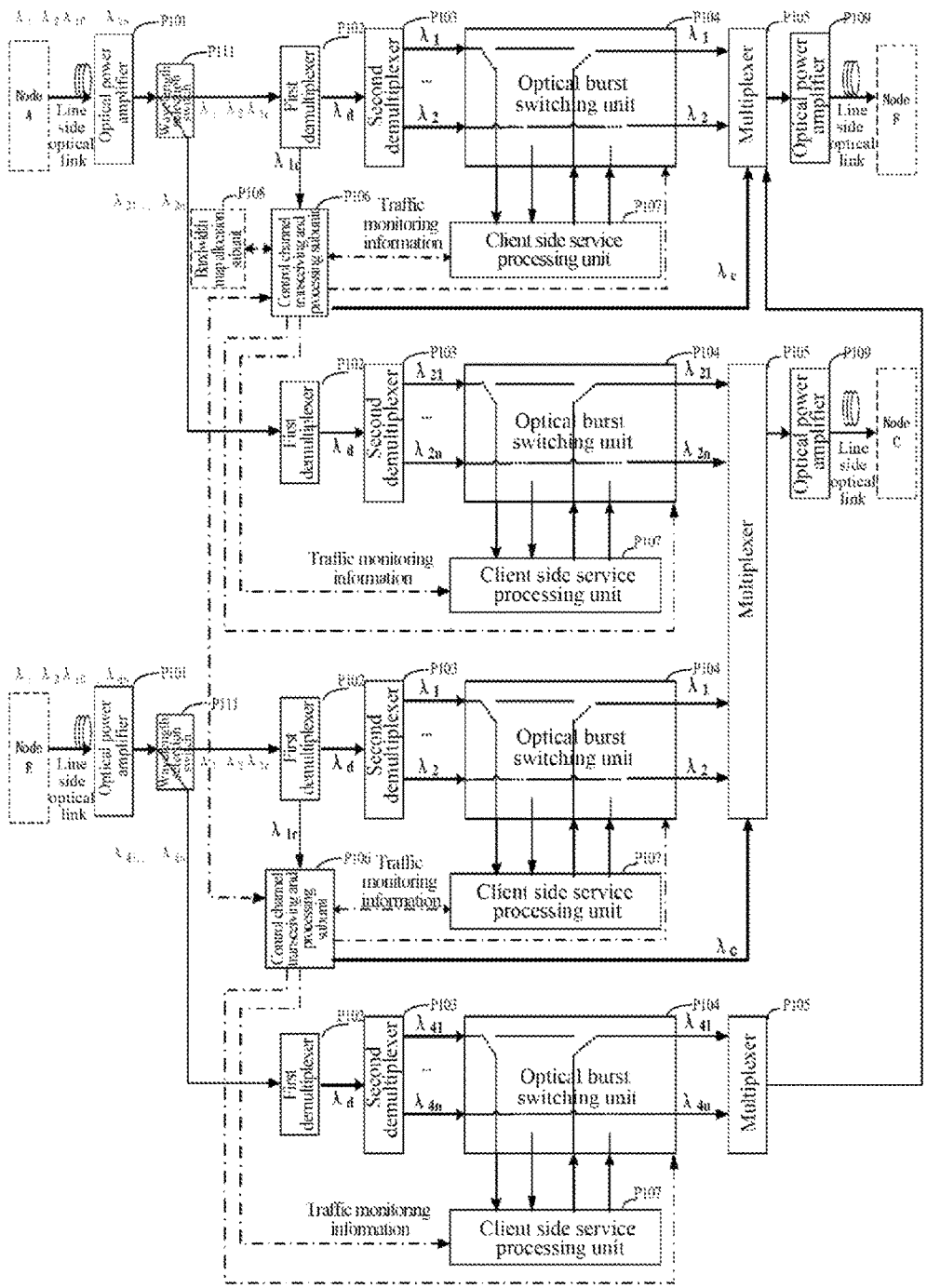
FIG. 18 is a schematic diagram of a master node, Node D, in embodiment three of the present disclosure.

As shown in FIG. 18, the FIG. 18 is a schematic diagram of the node D. In the present embodiment, the wavelength selection switch P111 is added to realize the wavelength grouping, and the wavelength grouping is performed on wavelength signals for the wavelength division multiplexing by adding the wavelength selection switch P111, as shown in FIG. 17.

In step 3, each logical sub-network is initialized.

In this embodiment, there is only one control channel that controls all nodes of all logical sub-networks, therefore, different logical sub-networks corresponding to one control channel are initialized respectively (any control channel and the corresponding nodes are initialized independently). The ring length L of the OBTN logical sub-network is measured with the virtual node D1 of the master node of the logical sub-network G101 in FIG. 15 as the starting point. L is the transmission time length of one round of the logical sub-network measured by the master node, and the length T+T1 of each OB is acquired according to the measurement result (T is a data length transmission time of the OB packet, and T1 is a guard interval between the OB packets), and the number N of OBs in the ring is calculated, then L=(T+T1)×N. And then the synchronous training is performed through the master node, and the master node D1 transmits the control frame ahead of the data frame for time T2. At the slave node, the slave node first receives the control frame, and after performing the photoelectric conversion and parse, the slave node determines to receive the corresponding data frame, and time difference for reception is fed back through the control channel. The main node adjusts T2 for multiple times to reach the system expectation, and then the slave node records the time difference of the control frame and data Frame.

All network nodes are synchronized with the master node under the control of the control channel, and a data channel of each logical sub-network performs the transmission of the data channel according to the indication of the control channel information.

In step 4, the master node transmits a corresponding data frame and a control frame carrying the bandwidth map to a slave node along all the logical sub-networks.

Figure 16:
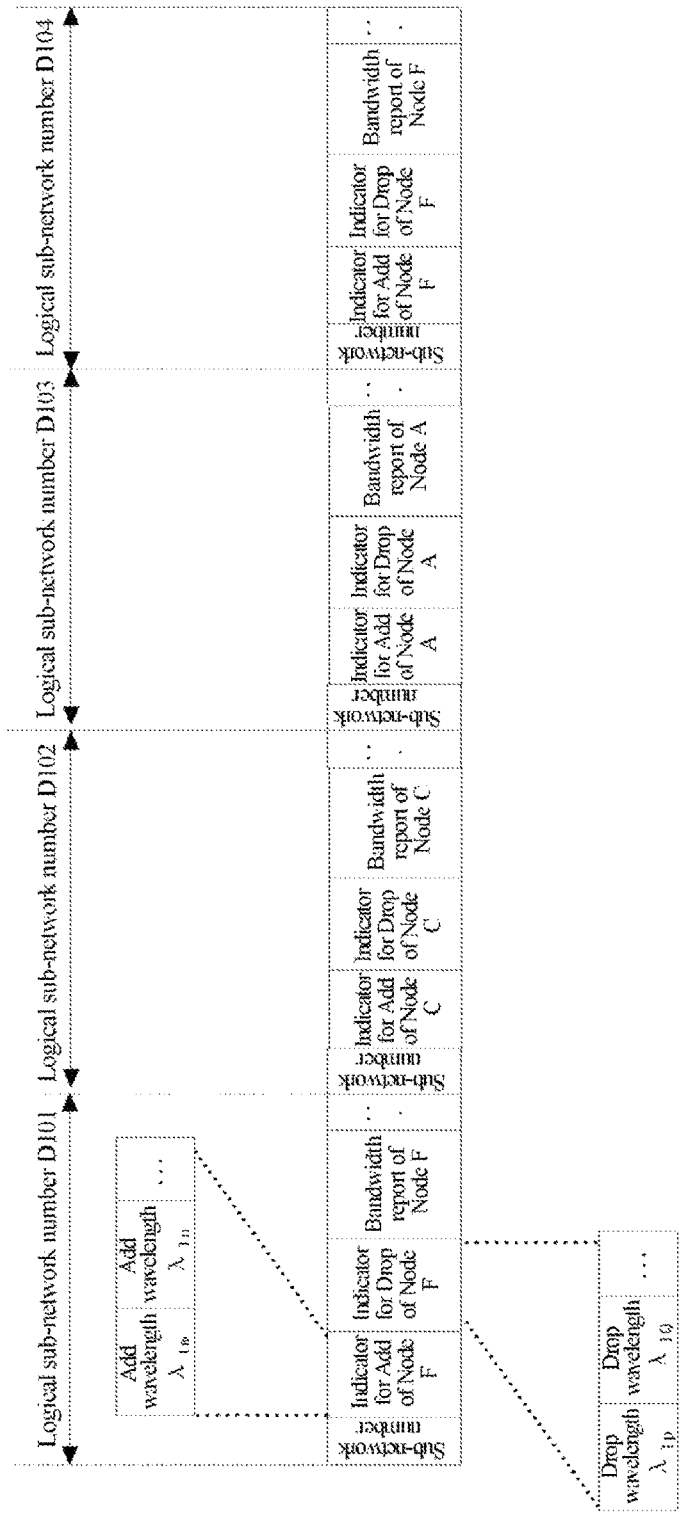
FIG. 16 is a schematic diagram of control frame information of a mesh OBTN network corresponding to embodiment three of the present disclosure.

FIG. 16 is a schematic diagram of the control frame of the logical sub-network D101. The control frame of the D101 controls the data transmission of each of logical sub-networks D101 to D104 at the same time. The control frame includes the following information, a logical sub-network number (that is, the sub-network number in the FIG. 16), the bandwidth map information of each logical sub-network, which includes indicators for the Add wavelength and the Drop wavelength of a node in each logical sub-network; and the bandwidth report reported by each node in each logical sub-network, that is, amount of data which expects to be transmitted in the next time period.

The updating frequency of the bandwidth map for each logical sub-network may be different.

In step 5, the slave node controls the transmission and reception of each time slot in the data frame according to the bandwidth map, and transmits a bandwidth request to the master node.

In step 6, the master node performs a bandwidth allocation calculation according to the bandwidth request, generates a new bandwidth map, and transmits the new bandwidth map to the slave node.

After receiving the bandwidth request transmitted by each slave node in a period of time of each logical sub-network, the master node may perform a wavelength allocation and time slot allocation for each node of each logical sub-network, and generate the new bandwidth map by the Dynamic Bandwidth Allocation (DBA) algorithm according to a current resource state of the entire network and a bandwidth request of each slave node.

Those ordinarily skilled in the art can understand that all or some of the steps of the abovementioned embodiments may be implemented by using a computer program process, the computer program may be stored in a computer-readable storage medium and the computer program may be executed on an appropriate hardware platform (such as a system, equipment, device, component, and so on), and during the execution, it includes one of the steps of the method embodiment or a combination thereof.

In an exemplary embodiment, all or some of the steps of the abovementioned embodiments can also be implemented with integrated circuits, these steps may be made into individual integrated circuit modules respectively, or some of the modules or steps can be made into a single integrated circuit module to implement.

The device/functional module/functional unit in the abovementioned embodiments may be implemented with universal computing devices, and they can be concentrated on a single computing device or distributed on a network composed of a plurality of computing devices.

When the device/functional module/functional unit in the abovementioned embodiments are implemented in the form of software functional module and sold or used as an individual product, they may be stored in a computer readable storage medium. The abovementioned computer-readable storage medium may be a read-only memory, magnetic or optical disk, and the like.

INDUSTRIAL APPLICABILITY

Embodiments of the present disclosure propose that the logical sub-networks of the OBTN optical burst transport network are determined at first, which is controlled by the master node centrally, and each logical sub-network adopts a synchronous transmission control scheme of the independent control frame and the data frame. Embodiments of the present disclosure reduce the complexity of the system and realize the complex mesh Optical Burst Transport Network (OBTN). In addition, another embodiment of the present disclosure further proposes a scheme for OBTN network line protection.

What I claim is:

1. A transmission method for an optical burst transport network, OBTN, comprising:
   acquiring a topology of a mesh OBTN network, and generating one or more logical sub-networks according to the topology of the mesh OBTN network; wherein a control platform unit is connected to each node in the mesh OBTN network through an optical supervisory channel (OSC) and the control platform unit acquires the topology of the mesh OBTN network by receiving node information through the OSC channel;
   updating, by a predetermined master node in the mesh OBTN network, bandwidth maps for all logical sub-networks; wherein the predetermined master node a node which all control channels pass through;

wherein the acquiring a topology of a mesh OBTN network, and generating one or more logical sub-networks according to the topology of the mesh OBTN network comprises:

traversing nodes of the mesh OBTN network in different sequences to generate logical sub-networks; or dividing the mesh OBTN network to obtain logical sub-networks according to data transmission requirements between nodes of the mesh OBTN network;

wherein each logical sub-network has a separate data channel; and one control channel corresponds to one or more data channels.

2. The method according to claim 1, wherein:
the predetermined master node is a node, which each sub-networks passes through and which each control channel passes through.

3. The method according to claim 1, wherein, updating, by a predetermined master node in the mesh OBTN network, bandwidth maps for all logical sub-networks comprises:

transmitting, by the predetermined master node in the mesh OBTN network, a corresponding data frame to a slave node along the all logical sub-networks, and selectively transmitting a control frame carrying a bandwidth map; performing a bandwidth allocation calculation according to a bandwidth request transmitted by the slave node, generating a new bandwidth map, and transmitting the new bandwidth map to the slave node through the control frame.

4. The method according to claim 3, wherein:
the control frame comprises the following information: a logical sub-network number, a bandwidth map for each logical sub-network, a bandwidth request of each node in a next time period; the bandwidth map comprises indicators for Add wavelength and Drop wavelength of a node in each logical sub-network; and the bandwidth request comprises amount of data which each node expects to transmit in the next time period.

5. The method according to claim 1, further comprising:
when one logical sub-network is broken, allocating, by the master node, data to transmit from other logical sub-network.

6. A non-transitory computer-readable storage medium, storing computer-executable instructions, wherein the computer-executable instructions are used to execute the method of claim 1.

7. A transmission system for an optical burst transport network, comprising:

a control platform unit, comprising a processor to acquire a topology of a mesh OBTN network, generate one or more logical sub-networks according to the topology of the mesh OBTN network; wherein the control platform unit is connected to each node in the mesh OBTN network through an optical supervisory channel (OSC) and the control platform unit acquires the topology of the mesh OBTN network by receiving node information through the OSC channel; wherein the control platform unit traverses nodes of the mesh OBTN network in different sequences to generate logical sub-networks; or divides the mesh OBTN network to obtain logical sub-networks according to data transmission requirements between nodes of the mesh OBTN network;

a network control unit, arranged at a predetermined master node in the mesh OBTN network, comprising a processor to update bandwidth maps for all logical sub-networks; wherein, the predetermined master node is a node which all control channels pass through;

wherein each logical sub-network has a separate data channel; and one control channel corresponds to one or more data channels.

8. The system according to claim 7, wherein:
the predetermined master node is a node which each sub-networks passes through and which each control channel passes through.

9. The system according to claim 7, wherein, the network control unit comprises:

a control channel transceiving and processing subunit, when executed on the processor of the network control unit, causing the processor of the network control unit to transmit a corresponding data frame to a slave node along each of the all logical sub-networks, and selectively transmit a control frame carrying a bandwidth map;

a bandwidth map allocation subunit, when executed on the processor of the network control unit, causing the processor of the network control unit to perform a bandwidth allocation calculation according to a bandwidth request transmitted by the slave node, and generate a new bandwidth map;

wherein the control channel transceiving and processing subunit, when executed on the processor of the network control unit, further causes the processor of the network control unit to transmit the new bandwidth map to the slave node through the control frame.

10. The system according to claim 7, wherein:
the control frame comprises the following information: a logical sub-network number, a bandwidth map for each logical sub-network, a bandwidth request of each node in a next time period; the bandwidth map comprises indicators for Add wavelength and Drop wavelength of a node in each logical sub-network; and the bandwidth request comprises amount of data which each node expects to transmit in the next time period.

11. The system according to claim 7, wherein:
the processor of the network control unit allocates data to transmit from other logical sub-network when one logical sub-network is broken.

* * * * *